Patented Feb. 22, 1944

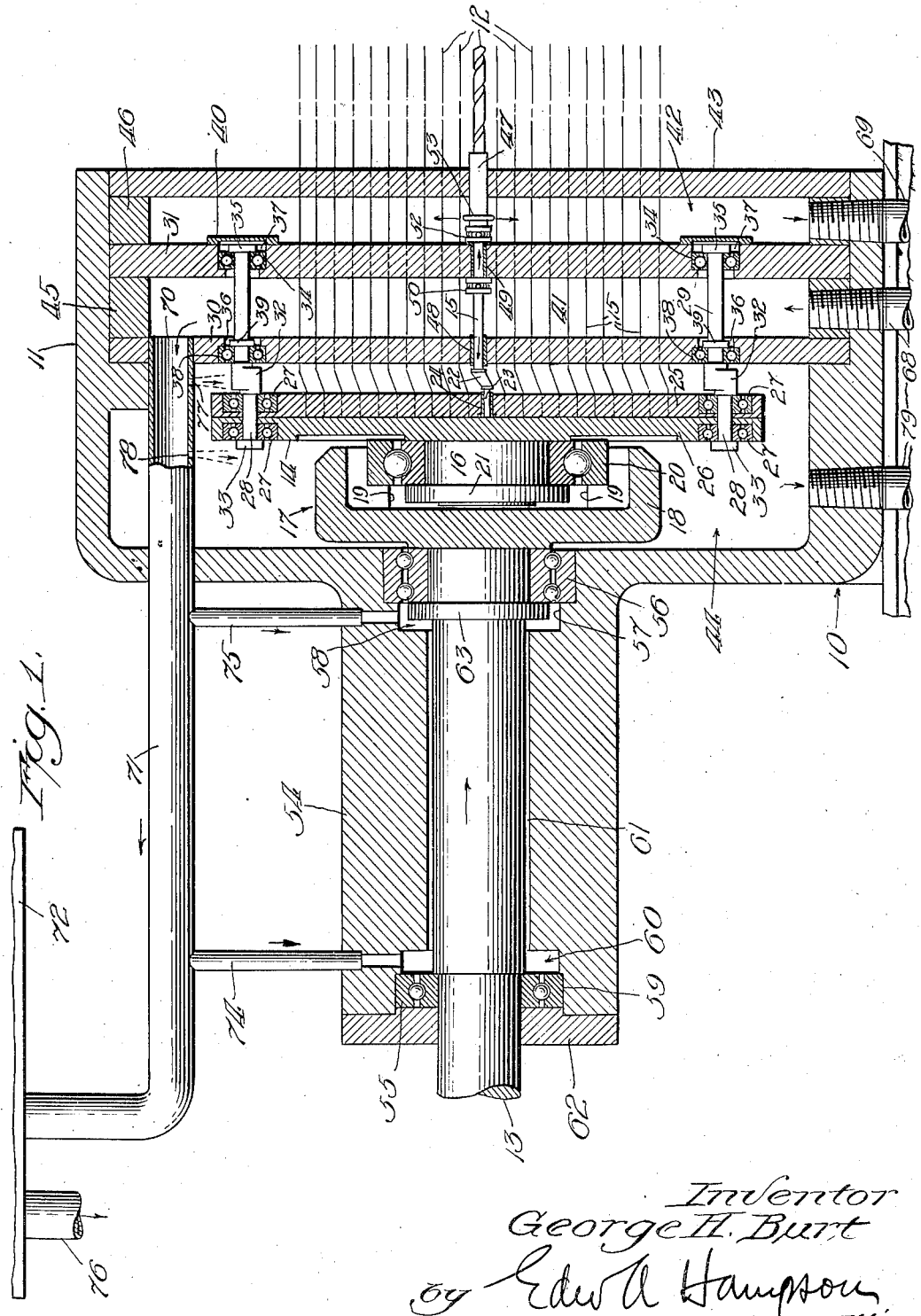

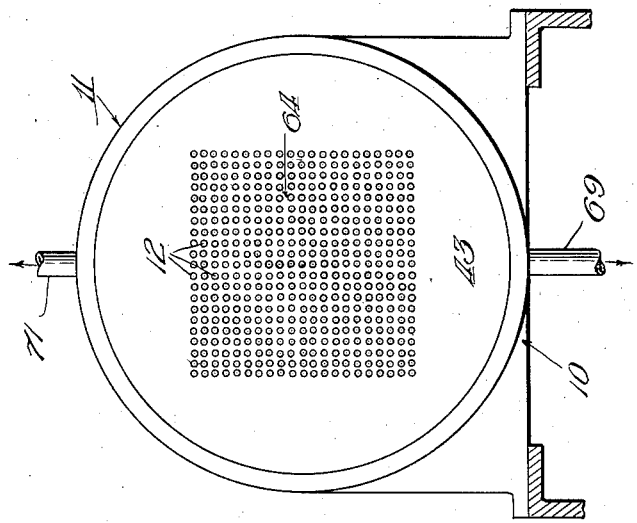
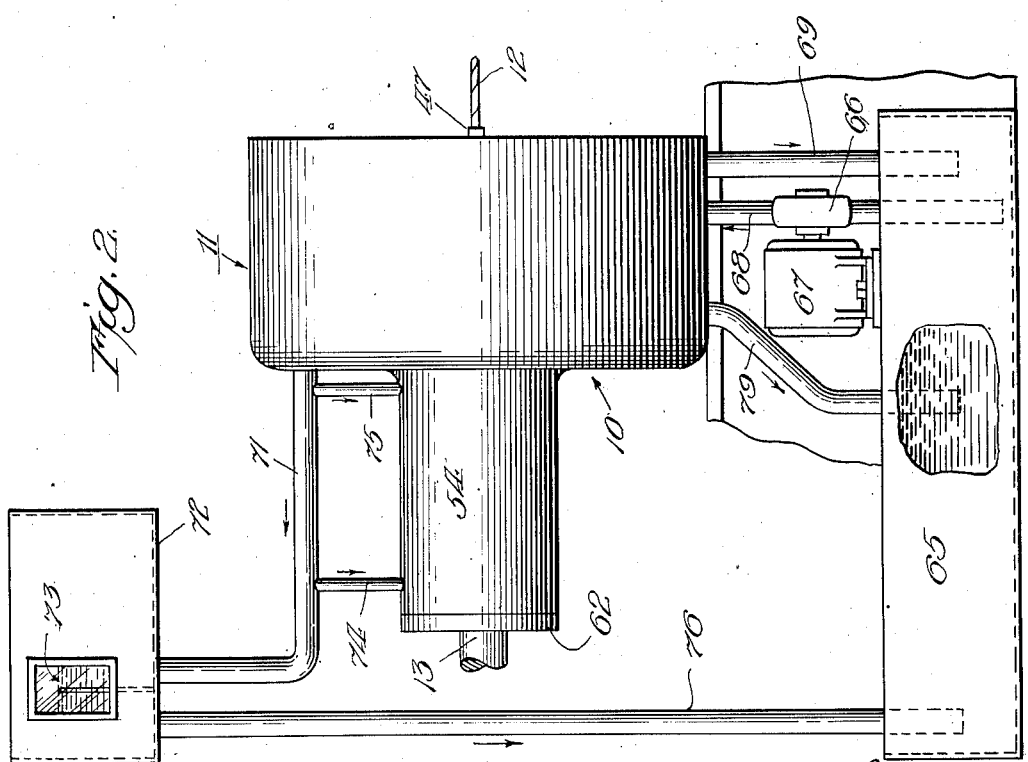

2,342,251

UNITED STATES PATENT OFFICE 2,342,251

MULTIPLE SPINDLE DRILLING APPARATUS

George H. Burt, Metairie, La., assignor to The Celotex Corporation, Chicago, Ill., a corporation of Delaware Application October 28, 1939, Serial No. 301,708

18 Claims. (Cl. 77—22)

This invention relates to a method and apparatus for oiling a multiple spindle horizontal drill and particularly to a type of multiple spindle horizontal drill adapted for drilling the perforations in acoustical material, requiring a large number of perforations within a relatively small area.

In the driving mechanism for a multiple spindle horizontal drill for which the novel lubricating system is applicable, it is preferred to drive the multiple spindles from a single power shaft or main drill spindle through an eccentric drive plate which drives the spindles forming the multiple spindle drill head and which are operatively connected to the eccentric drive plate. The speed with which the drills run necessitates that the bearings for the drill spindles are at all times thoroughly lubricated. A drill head such as will be disclosed in detail has thousands of moving parts confined to a small space and it is necessary to provide a positive circulating supply of lubricant to all of the moving parts in order to maintain satisfactory operation of the drill.

The novel lubricating system which is to be described in detail is particularly applicable to a horizontal drill. In this lubricating system, the oil flow flows upwardly from a positive pressure system and between spindle bearing plates passing out at the top of the drill head to a constant head and overflow reservoir from which the lubricant returns to a sump. From a pipe leading from the overflow are passages providing for a continuous supply of oil to eccentric drive shaft bearings or main drive shaft bearings. From an oil passage to the overflow, the lubricant flows down over the revolving cranks which actuate the multiple drill spindles and this lubricant also lubricates the eccentric disc crank bearing.

Another passage is provided in the conduit to the overflow reservoir through which lubricant drips onto the eccentric drive bearing. The overflow reservoir maintains a constant pressure of the oil on the spindle bearings as well as on the main drive shaft bearings. The thrust bearings on the spindles, one of which is between the bearing plates, is submerged in oil, while the other is on the front side of the bearing plate and is oiled by the oil seeping through the spindle bearing. This lubricant which passes beyond the thrust bearing is carried out to the edge of the group of spindles by an oil flinger on each spindle from which the lubricant is thrown off and collects in the space between the front bearing plate and the cover plate of the drill head, and then the lubricant drains back to the sump.

In addition to the above circulation of the lubricant, the lubricant also seeps through the rear plate of the drill head and provides additional oil to the spindle cranks. While the lubricating system is in operation, the interior cavity of the drill head in which the spindle cranks revolve is completely filled with a continuous spray of oil at all times.

The principal object of this invention is therefore to provide a novel lubricating system and method of lubricating a multiple spindle horizontal drill. This object is accomplished by positively pumping oil through the drill head to lubricate the spindle bearings and thrust bearings of the multiple spindles of the drill head and to force the oil to an overflow reservoir where a static head is maintained to positively oil the eccentric drive shaft bearings while at the same time oil is sprayed over the revolving cranks for actuating the multiple spindles and oil is also dripped on the eccentric drive bearing for the eccentric drive plate, the oil being returned to a sump where it is again recirculated.

Another object of the invention is to provide a novel drive wherein a plurality of spindles are driven from a main drive shaft. This object is accomplished by driving the multiple spindles through cranks thereon actuated from an eccentric drive plate driven by a main drive shaft.

Another object of the invention is to provide a novel spindle construction and means for journaling the spindle and associated crank to its actuating mechanism.

Another object of the invention is the application of combined pressure lubricating and spray-type lubrication to a horizontal drill.

Another object of the invention is to provide a multi-spindle drill head particularly adapted for drilling the perforations in acoustical material and preferably for drilling the perforations in felted fibrous sheet material.

Further objects, advantages and features of the invention will become apparent from the following detailed description of the preferred embodiment of the invention as illustrated in the accompanying drawings, wherein like reference characters indicate similar parts.

Referring to the drawings:

Figure 1 is a diagrammatic vertical sectional view, illustrating the means for actuating the multiple spindles from a main drive shaft and the flow of the oil within the enclosed drill head and associated passageways;

Figure 2 is a side elevation of the multiple spindle drill head illustrating the oil sump, oil pump, overflow, and associated pipe connections interconnecting the various members of the assembly; and, Figure 3 is an end elevation illustrating the position of the multiple spindle drills when adapted for perforating acoustical tile and the like.

Referring to Figures 1 and 2 of the drawings, the numeral 10 indicates a horizontal multiple spindle drill with the platen and supporting framework removed as these are not necessary for the understanding of the invention. For the use to which the horizontal multiple spindle drill is given, a drill head 11 is provided with a plurality of drills 12 for perforating sound absorbing material to form an acoustical corrective material. The material which is used for the acoustical corrective material is preferably ligno-cellulosic fibrous material which has been felted from a water suspension of fibre, preferably bagasse fibre, to which has been added various treatments for water-proofing, fungus-proofing and insect-proofing the finished material.

Such fibrous material when utilized as an acoustical corrective material is preferably formed into tile substantially 12 inches by 12 inches or multiples thereof and substantially ¼ inch to 1½ inches in thickness depending upon the amount of sound absorption needed, which is then drilled with the multiple spindle drill to form perforations thereon spaced substantially 11/16 of an inch apart so that each square foot of the tile has substantially 441 perforations uniformly spaced, of a uniform depth and having a diameter of substantially 1/8 inch. It is obvious that variations in the size and shape and number of perforations may be had without departing from the scope of the invention.

It is preferred to actuate each of the drills in the multiple spindle head simultaneously from a main spindle or main drive shaft 13 of the drill press. The novel mechanism for driving the multiple drills 12 comprises an eccentric disc 14 to which each of the drills 12 are operatively connected by drill spindles 15. The eccentric disc 14 is operatively connected to the main shaft or eccentric drive shaft 13 through a stub shaft 16 affixed to the eccentric disc 14. The stub shaft 16 forms with its associated members an eccentric drive 17 between the main shaft 13 and the eccentric disc 14.

The eccentric drive 17 is formed by eccentrically positioning the axis of the stub shaft 16 and its associated eccentric disc 14 with respect to the axis of the main drive shaft 13 and forms eccentric means for eccentrically driving the eccentric disc or plate from the drive shaft. The amount of eccentricity is substantially ¼ of an inch. The eccentric plate 14 together with its contiguous driving mechanism forms means for driving the drill spindles. The main shaft 13 is provided with an annular housing 18 upset on the shaft 13 or suitably affixed thereto. Webs 19 are radially positioned about the annular housing 18 and adapted to receive a ball bearing 20. The outer race of the bearing is preferably press fitted to the webs 19 of the annular housing 18, and the inner race is pressed onto the stub shaft 16 and held in place by a collar 21 suitably keyed or fixed to the shaft 16, as illustrated in Figure 1. It is obvious, therefore, as the shaft 13 is uniformly driven that an eccentric motion is given to the eccentric disc 14 wherein its eccentricity is substantially ¼ of an inch. Obviously as the shaft 13 is driven the disc is given an eccentric motion.

The drill spindles 15 are driven from the eccentric disc through an eccentric crank 22 which has a stub crank shaft 23 journaled in a bearing 24 mounted in a plate member 25 of the eccentric disc 14. The plate member 25 is preferably formed by boring the plate with the number of holes equal to the number of spindles to be used and pressing the bearings 24 therein.

The eccentric disc 14 is preferably formed, as illustrated in Figure 1, of two plate members 25 and 26. The outer plate member 25, as previously described, serves as a mounting for the crank shafts 23 for the drill spindles 15 while the inner plate member 26 provides the connection between the main drive shaft 13 through the cooperation of the eccentric drive 17. The plate members 25 and 26 are contiguously mounted and provide through ball bearings 27 journals for stub crank shafts 28 of crank shafts 29 journaled in inner and outer spindle bearing plates 30 and 31, respectively.

The crank shafts 29 which take the thrust of the spindles 12 and support the weight of the eccentric disc 14 have their crank arms 32 of the same eccentricity as the eccentric drive 17 which is substantially ¼ of an inch. Similarly, the drill spindles 15 and their eccentric cranks 22 are also of the same eccentricity as the crank arms 32. The crank shafts 29 and cooperating members are set forth in the claims as means for supporting the eccentric plate. The bearings 27 serve to journal the stub shafts 28 and are so mounted that the inner races of the bearings 27 mounted in the plate member 25 are in abutting relationship against a shoulder of the crank 32 while the inner races of the bearings 27 mounted in the plate 26 abut thrust collars 33 secured to the shaft 29 in any suitable manner.

The crank shafts 29 are supported and journaled in the spindle bearing plates 30 and 31, respectively, the outer end of the crank shafts 29 being journaled in bearings 34 and the thrust of the spindles being taken by a thrust collar 35 contiguous to each bearing 34 and affixed to the shaft. The plates 30 and 31 are bored so that the axes of holes 36 and 37 for mounting the bearings 38 and 34 are in alignment. Inner thrust collars 39 abut against the inner races of the bearings 38 which in turn abut against a shoulder of the crank arms 32. The thrust collars 33, 35, and 39 form thrust means mounted on the crank shafts for taking the thrust of the multiple spindle drills. It is apparent from the disclosure and from the illustration, Figure 1, that the crank shafts 29 which support the eccentric disc 14 to take the load off of the bearing 20 of the eccentric drive 17 are rigidly supported by journaling the crank shafts 29 in the spindle bearing plates 30 and 31. An oil seal or cap 40 is provided over the holes 37 in the outer spindle bearing plate 31 to prevent the lubricant in a chamber 41 formed between the spindle bearing plates 30 and 31 from entering a chamber 42 formed in the drill head between the stationary spindle bearing plate 31 and the cover plate 43.

The drill head 11 preferably comprises three chambers 41, 42 and 44. The chambers are formed in the drill head 11 between stationary spindle bearing plates 30 and 31 and between spindle bearing plate 31 and the cover plate 43. The chambers 41 and 42 are formed by spacing the spindle bearing plates 30 and 31 and the cover plate 43 by annular rings 45 and 46 while the chamber 44 is formed by the space between the inner end of the drill head 11 and the stationary spindle plate 30. The spindle plates 30 and 31 and cover plate 43 are in alignment, and at the same time, clearance is provided in the cover plate 43 for collets 47 mounted on the drill spindles 15 to receive the drills 12.

A typical drill spindle assembly for this multiple spindle drill head comprises the drill spindle 15, the drill collet 47 and the drill 12. The inner end of the drill spindle, as previously described, has a crank 22 with the crank shaft 23 journaled in a bearing 24 mounted in the moving drive plate 25 of the eccentric disc 14. The drill spindle 15 is also journaled in its intermediate portions in bearings 48 and 49 mounted respectively in the inner and outer spindle plates 30 and 31. The bearings 24, 48 and 49, as they are on substantially ¾ inch centers, are provided with securing devices to hold the bearings in place and at the same time with securing means which may be readily detached to allow the removal of bearings for repair. A reverse thrust bearing 50 is mounted on the drill spindle shaft 15 contiguously to the inner side of the stationary spindle bearing plate 31. The drill spindle 15 has a portion which is reduced in cross-section and this portion is journaled in bearing 49 mounted in the stationary bearing plate 31. A thrust bearing 52 is mounted at the end of the drill spindle 15 between the bearing plate 31 and the collet 47. The thrust bearings 50 and 52 form thrust means mounted on the drill spindle and adapted to take the thrust of the drill spindle in either direction.

The drill collet 47 is provided with a ring 53 which acts as an oil flinger for the oil seeping through between the reduced shaft portion of the drill spindle 15 and its bearing 49 so that as the oil seeps through, the thrust bearing 52 is oiled both from the seepage and from the oil flung from the annular ring 53 which also prevents the oil, which would stain the material being drilled, from leaking along the surface of the drill collet 47 and onto the drill spindles 12. The drill collet 47 is preferably threaded on the reduced shaft portion of the drill spindle 15 and the tang of the drill 12 is preferably secured by a drill lock pin or other suitable form of securing means well known in the art for securing drills in their collets so that the drills may be readily attached and detached to their drill spindles.

The main drive shaft 13 because of the load of the eccentric drive and its associated parts and because of the speed with which the drill spindle 13 is operated is also preferably journaled in the main drive shaft housing 54, cast or otherwise formed on the drill head 11. The main drive shaft 13 is journaled in bearings 55 and 56 and as the load at the inner end of the shaft 13 is very large it is preferred to use a double type of ball bearing to carry the load. The inner bearing 56 is mounted in a stepped bore 57 to provide mounting space for the bearing 56 and at the same time an annular oil chamber 58. The housing 54 is bored at its outer end with a stepped bore 59 to receive the bearing 55 and also to provide an annular oil chamber 60, similar to that at 58, and both of these chambers 58 and 60 are interconnected by the annular passage 61 surrounding the shaft 13. A cap 62 provides an oil seal and at the same time secures the bearing 55 in position. The inner bearing 56 has a thrust collar 63 contiguous to the inner race of the bearing and the collar 63 is keyed or otherwise secured to the shaft 13.

The drill head 11 is preferably secured to a horizontal frame which has not been shown in detail as it is not necessary for an understanding of the invention and mounted adjacent to the drill head 11 is a motor, not shown, which preferably is directly coupled to the drive shaft 13 for directly driving the main drive shaft 13 from the motor. The drill head 11 is also intermediately positioned on the main frame of the horizontal drill between the drive motor and the platen of the drill which is preferably hydraulically driven and is moved longitudinally with respect to the drill head to clamp the material being drilled to the stripper plate and to simultaneously perforate the material which is being drilled to form the sound absorption material. This construction has not been shown as it is not necessary for the understanding of the operation of the mechanism in the drill head and the associated lubricating system and needs only be generally described for the operation of the horizontal drill and its associated parts.

The operation of the multiple spindles will be described particularly with respect to the changing of the uniform rotary motion of the main drive shaft to an eccentric motion for uniformly driving the plurality of drill spindles and drills with a rotary motion. The speed of operation of the drills, since they are substantially $\frac{3}{16}$ inch diameter drills, is substantially the same as that used for wood drills as the material which is being drilled being fibrous necessitates a high speed drill to leave a clean hole. It is preferred to operate the drill spindles at 1200 R. P. M., although they have been operated as high as 1800 R. P. M. As the shaft 13 is rotated, the uniform rotary motion of the shaft is transformed by the eccentric drive 17 into eccentric motion of the eccentric disc 14. The eccentric disc 14 has a slight eccentricity of substantially ⅛ inch and is mounted for eccentric motion on the eccentric cranks 29 which support the load of the eccentric disc and associated parts and also take the thrust of the load applied to the multiple spindle drills 12 as the material being drilled is fed into the drill spindles. The eccentric disc 14 in turn transforms its eccentric motion into uniform rotary motion for the drill spindles 15 and associated drills 12 through the eccentric cranks 22 of the drill spindles 15. In the particular apparatus disclosed, rotary motion of the main shaft 13 is transformed through the eccentric drive 17 and associated parts into uniform rotary motion for substantially 441 drill spindles operating within an area less than 12 inches by 12 inches. Therefore, with this mechanism it is possible to simultaneously perforate or drill 441 holes placed on $^{17}/_{32}$ inch centers as best illustrated in the pattern 64 of the drills 12, Figure 3.

A principal object of the invention as set forth above was to provide a satisfactory lubricating system for the large number of moving parts within the drill head so that the mechanism of the drill head will be satisfactorily lubricated at all times, thus preventing shut-down of the apparatus due to the necessity of replacing worn parts which may have worn out because of insufficient lubrication or they because of insufficient lubrication wear out and let go which might further wreck the drill head with increased cost and loss of time for repairing the head. With the novel apparatus disclosed, it is possible to efficiently lubricate all of the rotating parts of the drill head.

An oil sump 65, Figure 2, is provided within the base frame on which the drill head is mounted so that a self-contained horizontal drill is had which may be moved from place to place in the production line. A pump 66 driven by the motor 67 pumps lubricant from the sump 65 through the piping 68 into the chamber 41 formed between the stationary spindle bearing plates 30 and 31. The pump together with the associated structure in the drill head assembly forms means for lubricating the drill head assembly. The chamber 41 at all times is under pressure and completely filled so that the lubricant within this chamber oils the thrust bearings 50 within the chamber and at the same time the lubricant is permitted to seep along the spindle shaft 15 to lubricate the bearings 48 and 49. The ball thrust bearings 50 on the inner side of the spindle bearing plate 31 are submerged in oil while the ball thrust bearings 52 on the opposite side of the spindle operating plate 31 are lubricated by the lubricant seeping through the spindle bearing 49. The oil as it passes beyond the ball thrust bearings 52 is carried out to the end of the group of spindles by oil flingers 53 on each drill collet 47. The spray of this oil, as it is flung off maintains an oil fog in chamber 42 serving to oil the bearings 52, and any excess which is thrown off collects in the space 42 at the bottom of the drill head between the front bearing plate 31 and the cover plate 43. From this chamber, the excess oil drains back through the piping 69 to the oil supply sump 65 from which it is again circulated.

The chamber 41, which is under pressure and completely filled with lubricant so that as above described the bearings 50 are submerged in oil, has an outlet 70 at the top of the chamber. A conduit 71 connects the upper end of the oil chamber 41 with an overflow tank 72 which may be cast integral with the drill head 11, or as illustrated for diagrammatic purposes in Figures 1 and 2, it may be separately installed on the drill press. It is preferred that the level 73 of the lubricant is substantially 6 to 8 inches above the top of the spindle bearing plates 30 and 31 so that there is maintained a constant pressure of oil on the spindle bearings 48 and 49 as well as the main drive shaft bearings 55 and 56. The oil pressure on the bearings 55 and 56 is maintained by the head of the lubricant maintained in the overflow tank 72 and in the contiguous piping 71 and associated piping 74 and 75 respectively, connected to the chambers 60 and 58, and interconnected through the annular passage 61 to respectively oil the bearings 55 and 56. The overflow above the predetermined level 73 in the tank is drained back into the sump 65 through the piping 76.

The lubricant from the chamber 41 which is under pressure at all times, as previously disclosed, not only seeps along the inner end of the spindle shafts 15 to lubricate the bearings 48 but also seeps out into the chamber 44 to provide additional oil for the spindle cranks 22 and thus lubricate the crank shafts 23 journaled in the bearings 24 which are mounted in the moving driving plate 25. This lubricant supplied to these bearings 24 is additional to that supplied from a hole 77 in the conduit 71. The hole 77 allows oil to flow down over the revolving cranks 32 and the revolving cranks 22 of the drill spindles 15. The oil which is within the chamber 41 also serves to oil the bearings 34 and 38 which journal the crank shafts 29, preferably four in number, which support the eccentric disc 14. The inner bearings 38 also permit oil to seep through from the chamber 41 into the chamber 44 to oil the cranks 32 and also the seepage from the chamber 41 and the jet of oil from the opening 77 also oils the cranks 32 and their associated bearings 27. A second smaller opening 78 in the conduit 71 and positioned within the chamber 44 drips oil on the eccentric drive bearing 20. Actually the interior cavity 44 of the drill head in which the spindle cranks 32 and associated mechanism operate is completely filled with a continuous spray of oil at all times due to the large number of high speed moving parts therein which serve to distribute the oil as a fog in the chamber. The oil collecting at the bottom of the chamber 44 is returned through conduit 79 to the sump 65 where the oil which has been returned from the returns 69, 79 and 76 is again recirculated throughout the drill head as has been previously described in detail.

The arrangement which has been disclosed provides a positive circulating supply of lubricant to all of the moving parts in the drill head and to a large extent is responsible for the satisfactory operation of the drill. This system which has been described is only applicable to a horizontal drill but it is obvious that such a system may be applied equally as well by one skilled in the art to a multiple spindle drill head of this nature when used with a vertical spindle drill assembly without departing from the scope of the invention.

It is evident from the foregoing disclosure that there has been described a novel driving mechanism for a multiple spindle drill head and also a novel oiling system for oiling the numerous parts within this assembly. The various moving parts are suitably lubricated as has been previously disclosed in detail by the oil forced into the space between the spindle bearing plates and passing out through the pipe at the top to an overflow tank 72 which returns the lubricant to the oil supply tank 65. In the pipes 71 from the overflow are connections 74 and 75 providing a continuous supply of oil to the main or eccentric drive shaft bearings 55 and 56 and in addition a hole 77 through which oil flows down over the revolving cranks 22 and 32 and so oils the crank bearings thereof, and a second smaller hole 78 which drips oil on the eccentric drive bearing 20.

The overflow tank 72 is installed above the top of the drill head several inches to maintain a constant pressure of oil on the spindle bearings 48 and 49 as well as the main drive shaft bearings 55 and 56. There are two ball thrust bearings 50 and 52 on the spindles 15 one of which is between the bearing plates 30 and 31 and is submerged in the lubricant, and the other is on the front side of the front bearing plate and is oiled by the lubricant seeping through the spindle bearing 49. This oil or lubricant passes beyond the ball thrust bearing and is carried out to the edge of the group of spindles by an oil flinger 53 on each drill collet 47 from which it is thrown off and collects in a chamber between the front bearing plate 31 and a cover plate 43, and from there it drains back into the sump 65.

In addition to this the lubricant seeps through the rear bearing plate 30 and provides additional oil to the spindle cranks 22. As previously disclosed when the flow of the lubricant was described in detail, the interior cavity of the drill head 11 in which the spindle cranks 22 and 32 revolve is completely filled with a continuous spray of oil at all times.

It is obvious from the above general description and the prior detailed description that there has been disclosed a novel method of simultaneously lubricating the great multiplicity of moving parts within the drill head and also that as the lubrication of the parts takes place simultaneously, certain of the parts are lubricated by pressure lubrication while others are lubricated through the seepage of the lubricant through the bearings to lubricate associated parts thereof and also while certain parts are being positively lubricated other parts are being lubricated in a continuous spray or fog of lubricant. In addition to this, the lubricant is positively circulated and returned by gravity to the supply sump from which it is again recirculated.

While the novel driving mechanism for multiple spindles and the method of positively lubricating the mechanism above described exemplified a preferred form of the invention, it will be obvious to those skilled in the art that various modifications of the apparatus and method are possible without departing from the scope of the invention, as defined in the following claims.

What is claimed is:

1. In a multiple spindle drilling apparatus, the combination with a drive shaft, of a drill head assembly comprising a chamber and a plurality of closely spaced drill spindles journaled in the walls thereof, an eccentric plate for driving the spindles with rotary motion, an eccentric means for eccentrically driving the plate from the drive shaft, and means for lubricating the drill head assembly, said means comprising lubricant and an overflow tank therefor, and an oil pump whereby the drill spindles are pressure lubricated by placing the chamber under pressure from the pump and a conduit connecting the chamber to the overflow tank and having orifices discharging the lubricant whereby the eccentric plate and eccentric means are operated in a spray of lubricant.

2. In a multiple spindle drilling apparatus, the combination with a drive shaft, of a drill head assembly comprising a chamber and a plurality of closely spaced drill spindles journaled in the walls thereof, an eccentric plate for driving the spindles with rotary motion, an eccentric means for eccentrically driving the plate from the drive shaft, and means for lubricating the drill head assembly, said means comprising lubricant and an overflow tank therefor and an oil pump whereby the drill spindles are pressure lubricated by placing the chamber under pressure from the pump, a conduit connecting the chamber to the overflow tank and having orifices discharging lubricant under pressure whereby the eccentric plate and eccentric means are operated in a spray of lubricant, and piping connected to the aforesaid conduit whereby the drive shaft is lubricated under a substantially constant pressure head of lubricant.

3. In a multiple spindle drilling apparatus, the combination with a drive shaft, of a drill head assembly comprising a plurality of chambers and a plurality of closely spaced drill spindles journaled in the walls of one of said chambers, spaced on substantially $17/32$ of an inch centers and comprising substantially twenty-one rows of twenty-one drill spindles, an eccentric plate for driving the drill spindles with rotary motion mounted in another of said chambers, an eccentric means for eccentrically driving the eccentric plate from the drive shaft mounted in said last mentioned chamber, and means for lubricating the drill head assembly comprising an oil pump for placing the first mentioned chamber under pressure and spraying oil in the second mentioned chamber.

4. In a horizontal multiple spindle drilling apparatus, the combination with a horizontal drive shaft, of a drill head assembly comprising a plurality of vertical chambers and a plurality of closely related horizontal drill spindles, journaled in the vertical walls of one of said chambers, spaced on substantially $17/32$ of an inch centers and comprising substantially twenty-one rows of twenty-one horizontal drill spindles, a vertically mounted eccentric plate for driving the horizontal drill spindles with rotary motion mounted in another of said vertical chambers, eccentric means for eccentrically driving the vertically mounted eccentric plate from the drive shaft mounted in said last mentioned chamber, and means for lubricating the drill head assembly comprising pressure means for placing the first mentioned chamber under pressure and spraying oil downwardly into said second mentioned chamber.

5. In a multiple spindle drilling appartaus, a drill head assembly comprising a plurality of drill spindles, a housing having a plurality of chambers therein and adapted to mount the drill spindles, intermediate partitions forming an intermediate chamber and adapted to journal the drill spindles, means mounted in another chamber for driving the drill spindles, and means for lubricating the drill spindles and the means for driving the drill spindles, comprising a motor actuated pump, conduits, a sump tank for the lubricant and an overflow tank; whereby, as the drill head assembly is lubricated, the intermediate chamber is under pressure causing lubricant to seep along the drill spindles and lubricate them, and the means for driving the drill spindles is lubricated by a spray of lubricant; and, after the spindles and means for driving the spindles have been lubricated, the lubricant flows by gravity to the sump to be recirculated.

6. In a multiple spindle drilling apparatus, a drill head assembly comprising a plurality of drill spindles each having an eccentric crank, a housing having a plurality of chambers therein and mounting the drill spindles, intermediate partitions in the housing forming an intermediate chamber and journaling the drill spindles, eccentric drive means comprising an eccentric plate journaling the eccentric cranks of the drill spindles and driving the drill spindles with rotary motion, and means comprising a motor actuated pump, conduits, a sump tank for lubricant and an overflow tank for lubricating the drill spindles and eccentric drive means for driving the drill spindles; whereby, as the drill head assembly is lubricated, the intermediate chamber is under pressure allowing lubricant to seep along the drill spindles and lubricate them, and the eccentric drive means for driving the drill spindles is lubricated by a spray of lubricant; and, after the spindles and eccentric drive means for driving the spindles have been lubricated, the lubricant flows by gravity to the sump to be recirculated.

7. The combination, in a multiple spindle drill head, of a drive shaft, bearings for the drive shaft, and oil chambers supporting the bearings for the drive shaft, the drill head comprising a plurality of drill spindles, a plurality of chambers, the intermediate chamber thereof adapted to journal the drill spindles, an eccentric drive plate mounted in another of said chambers, means for supporting said eccentric plate in the chamber comprising a plurality of crank shafts journaled in the partition of the intermediate chamber and to the eccentric plate, eccentric means for driving the eccentric plate from the drive shaft, and means for lubricating the drill spindles, the eccentric cranks for the drill spindles and the eccentric drive means, and the bearings for the drive shaft.

8. A multiple spindle drill head assembly adapted for pressure and spray lubrication comprising a housing, a main drive shaft journaled therein, a plurality of drill spindles journaled therein, an eccentric drive plate operatively supported by a plurality of crank arms for actuating the drill spindles, an eccentric means directly connected to the drive shaft and to the eccentric plate for driving the eccentric plate, whereby the rotary motion of the drive shaft is transformed into eccentric motion at the eccentric plate and the eccentric motion of the eccentric plate is transformed into rotary motion for driving the multiple drill spindles.

9. A lubricating system for a multiple spindle drill comprising a drill head assembly having operatively mounted therein a main drive shaft, an eccentric drive means thereon, an eccentric drive plate operatively connected to the eccentric means, and a plurality of drill spindles operatively connected to the eccentric drive plate, the aforesaid drill head assembly comprising a housing, and the housing divided into a plurality of chambers including an intermediate chamber, means for placing the intermediate chamber under pressure of a lubricant comprising a motor actuated pump, a conduit, and a sump from which the lubricant is pumped, means for spraying lubricant into another of said chambers comprising a conduit connected to the intermediate chamber, an overflow tank, and said last mentioned conduit connected to the overflow tank and to the chamber to lubricate the drive shaft whereby the drive shaft is lubricated under constant pressure head, and means comprising conduits for connecting the overflow tank and the second mentioned chamber into which lubricant is sprayed and another chamber into which oil seeps from the intermediate chamber as well as into the second mentioned chamber to the sump whereby the lubricant returned by gravity to the sump is recirculated.

10. The combination with a main drive shaft and a drill head assembly comprising an eccentric drive plate, and an eccentric means for driving the eccentric plate from the main drive shaft, of a plurality of drill spindles, each of said drill spindles journaled in the drill head assembly and comprising a crank shaft for operatively connecting the drill spindle to the eccentric drive plate, thrust means mounted on the drill spindle and taking the thrust of the drill spindle in either direction, a drill collet mounted at the end of the drill spindle, and an oil flinger intermediate the thrust means and the drill collet.

11. The combination with a main drive shaft of a drill head assembly, said drill head assembly comprising a plurality of drill spindles, an eccentric drive plate operatively connected to the drill spindles and to the main drive shaft, means for supporting the eccentric drive plate comprising a plurality of cranks journaled in the drill head assembly and to the eccentric drive plate, and thrust means mounted on the crank shafts for taking the thrust of the multiple spindle drills.

12. The combination with a main drive shaft of a multiple spindle drill head comprising a plurality of closely assembled drill spindles, an eccentric drive plate for actuating the drill spindles, whereby the eccentricity between the eccentric drive plate and the drill spindles is substantially one-fourth of an inch, an eccentric means for actuating the eccentric plate from the main drive shaft comprising an annular housing mounted on the end of the drive shaft contiguous to the eccentric drive plate, a stub shaft on the eccentric drive plate, and a ball bearing operatively connecting the annular housing and the stub shaft, whereby the rotary motion of the drive shaft is transformed into eccentric motion by the eccentric drive means, and the eccentric motion of the eccentric drive means through the eccentric plate transforming the eccentric motion of the eccentric drive plate to rotary motion for operating the drill spindle.

13. A multiple spindle drilling apparatus comprising a drill head assembly having a plurality of closely positioned drill spindles, an eccentric plate supported by a plurality of crank arms for driving the drill spindles with rotary motion, an eccentric means comprising a stub shaft concentric with the eccentric plate and affixed thereto and eccentric with respect to an annular housing, the stub shaft journaled in the annular housing for eccentrically driving the eccentric plate, means comprising a drive shaft for driving the eccentric means whereby the drill spindles are actuated and said annular housing directly connected to said drive shaft.

14. A multiple spindle drilling apparatus comprising a drive shaft, a plurality of closely positioned drill spindles, an eccentric plate supported by a plurality of crank arms for driving the drill spindles with rotary motion, and an eccentric means for eccentrically driving the eccentric plate from the drive shaft, said drive shaft having mounted thereon an annular housing forming an element of the eccentric means, and said eccentric plate having a stub shaft journaled in the annular housing and forming another element of the eccentric means.

15. A horizontal multiple spindle drilling apparatus comprising a drive shaft, a plurality of closely positioned and horizontally mounted drill spindles, an eccentric plate vertically mounted by a plurality of crank arms for eccentric motion, operatively connected to the drill spindles and driving the drill spindles with rotary motion, and an eccentric means for eccentrically driving the eccentric plate from the drive shaft comprising an annular housing concentric with respect to the drive shaft, a stub shaft concentric with respect to the eccentric plate and affixed thereto, and eccentric with respect to the drive shaft and journaled in the annular housing.

16. A multiple spindle drilling apparatus comprising a drive shaft, a drill head assembly comprising a plurality of drill spindles each having an eccentric crank, a housing having a plurality of chambers including an intermediate chamber therein and mounting the drill spindles, intermediate partitions forming the intermediate chamber and journaling the drill spindles, eccentric drive means comprising an eccentric plate journaling the eccentric cranks of the drill spindles and driving the drill spindles with rotary motion, and means for lubricating the drive shaft and the drill head assembly comprising a motor actuated pump, conduits, a sump tank for lubricant and an overflow tank, whereby, after the drive shaft and drill head assembly are lubricated, the lubricant returns to the sump to be recirculated.

17. In a multiple spindle drilling apparatus, the combination with a drive shaft, of a drill head assembly comprising a plurality of closely positioned drill spindles, an eccentric plate for driving the drill spindles with rotary motion and an eccentric means for eccentrically driving the eccentric plate from the drive shaft, enclosing housings forming closed chambers about the drill head assembly, means circulating a continuous flow of lubricant into and through a said enclosing housing and means spraying a mist of lubricant into another of said enclosing housings; whereby a portion of said drill head assembly operates in a pool of lubricant and another portion thereof operates in a mist of lubricant.

18. A multiple spindle drilling apparatus comprising a drill head assembly adapted for pressure and spray lubrication, and having a plurality of closely positioned drill spindles, spaced on substantially $\frac{11}{16}$ of an inch centers and comprising substantially twenty-one rows of twenty-one drill spindles, and an enclosing housing through which the drill spindles are journaled, means forcing a lubricant in and through said housing, an eccentric plate mounted for driving the drill spindles with rotary motion, an eccentric means for eccentrically driving the eccentric plate, an enclosing housing in which the said driving means are enclosed, means spraying lubricant into said housing and over said driving means and means comprising a drive shaft for driving the eccentric means whereby the drill spindles are actuated.

GEORGE H. BURT.